United States Patent
Yonekubo et al.

(10) Patent No.: US 11,972,158 B2
(45) Date of Patent: Apr. 30, 2024

(54) PROVISION SYSTEM, PROVISION METHOD, AND MANAGEMENT DEVICE FOR PROVIDING RECORDING MATERIAL TO A USER OF A RECORDING DEVICE

(71) Applicant: SEIKO EPSON CORPORATION, Tokyo (JP)

(72) Inventors: Shuji Yonekubo, Matsumoto (JP); Shigenori Nakagawa, Tatsuno-machi (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/451,184

(22) Filed: Aug. 17, 2023

(65) Prior Publication Data

US 2024/0061627 A1 Feb. 22, 2024

(30) Foreign Application Priority Data

Aug. 18, 2022 (JP) .................. 2022-130450

(51) Int. Cl.
G06F 3/12 (2006.01)
G06Q 10/083 (2023.01)
G06Q 10/087 (2023.01)

(52) U.S. Cl.
CPC .......... G06F 3/1229 (2013.01); G06F 3/1203 (2013.01); G06F 3/1284 (2013.01); G06Q 10/083 (2013.01); G06Q 10/087 (2013.01)

(58) Field of Classification Search
None
See application file for complete search history.

(56) References Cited

U.S. PATENT DOCUMENTS

| 2016/0014286 | A1* | 1/2016 | Kishida | H04N 1/4426 |
| | | | | 358/1.15 |
| 2017/0285617 | A1 | 10/2017 | Sunata | |
| 2021/0373818 | A1* | 12/2021 | Yamada | G06F 3/1292 |
| 2023/0035111 | A1* | 2/2023 | Sadakuni | G06F 3/121 |
| 2023/0280951 | A1* | 9/2023 | Yamagata | G06F 3/1285 |
| | | | | 358/1.15 |

FOREIGN PATENT DOCUMENTS

JP 2008-114395 A 5/2008

* cited by examiner

*Primary Examiner* — Henok Shiferaw
(74) *Attorney, Agent, or Firm* — WORKMAN NYDEGGER

(57) ABSTRACT

A cartridge provision system includes a printer that ejects liquid (recording material) supplied from a cartridge onto a print medium; and a server 10 that manages a provision of the cartridge to a user of the printer, wherein the server 10 manages vendor inventory data 22, which is data that associated an inventory of the cartridge held by a sales company who provisions the cartridge to the user with expiration date of the cartridge, and a location data 33, which indicates the location of the user, and determines, when the sales company provisions the cartridge to the user, which expiration date of the cartridge should be provided from the inventory of the cartridge held by the sales company based on the vendor inventory data 22 and the location data 33.

5 Claims, 9 Drawing Sheets

PROVISION SYSTEM, PROVISION METHOD, AND MANAGEMENT DEVICE FOR PROVIDING RECORDING MATERIAL TO A USER OF A RECORDING DEVICE

The present application is based on, and claims priority from JP Application Serial Number 2022-130450, filed Aug. 18, 2022, the disclosure of which is hereby incorporated by reference herein in its entirety.

BACKGROUND

1. Technical Field

The present disclosure relates to a provision system, a provision method, and a management device for providing a recording material to a user of a recording device.

2. Related Art

JP-A-2008-114395 describes a technique for reducing an amount of ink wastefully disposed of due to an expiration date in an inkjet recording device that prints (records) with four colors of ink, cyan, magenta, yellow, and black, which are an example of a recording material. Specifically, the inkjet recording device described in JP-A-2008-114395 determines which ink should be used first based on the time period until the expiration date of each ink. Then, for example, if the black ink should be used preferentially, mixed-color dots formed by overlapping three colors of cyan, magenta, and yellow inks in print data are replaced with dots using the black ink. On the other hand, if the inks other than the black ink should be used preferentially, the dots of the black ink are replaced with the mixed-color dots in the print data.

However, the substitution described above may result in lower print quality because, strictly speaking, such print is printed by a different color than the expected color. In other words, when print quality was a priority, the amount of ink disposed of wastefully could not be reduced.

SUMMARY

A provision system includes a recording device that performs recording by applying a recording material to a medium; and a management device that manages provision of the recording material to one or more users of the recording device, wherein: the management device manages vendor inventory data, which is data that associates an inventory of the recording material held by a vendor who provisions the recording material to the one or more users with an expiration date of the recording material, and location data, which indicates a location of each of the one or more users and determines, when the vendor provisions the recording material to the one or more users, which expiration date of the recording material should be provided from the inventory of the recording material held by the vendor, based on the vendor inventory data and the location data.

A provision method of providing a recording material to one or more users who use a recording device that performs recording by applying the recording material to a medium, the provision method including managing vendor inventory data, which is data that associates an inventory of the recording material held by a vendor who provisions the recording material to the one or more users with an expiration date of the recording material, and location data, which indicates a location of each of the one or more users and when the vendor provisions the recording material to the one or more users, determining, based on the vendor inventory data and the location data, which expiration date of the recording material should be provided from the inventory of the recording material held by the vendor.

A management device that manages provision of a recording material to one or more users who use a recording device that performs recording by applying the recording material to a medium, wherein: the management device manages vendor inventory data, which is data that associates an inventory of the recording material held by a vendor who provisions the recording material to the one or more users with an expiration date of the recording material, and location data, which indicates a location of each of the one or more users and determines, when the vendor provisions the recording material to the one or more users, which expiration date of the recording material should be provided from the inventory of the recording material held by the vendor, based on the vendor inventory data and the location data.

DESCRIPTION OF EMBODIMENTS

1. First Embodiment

Figure 1:
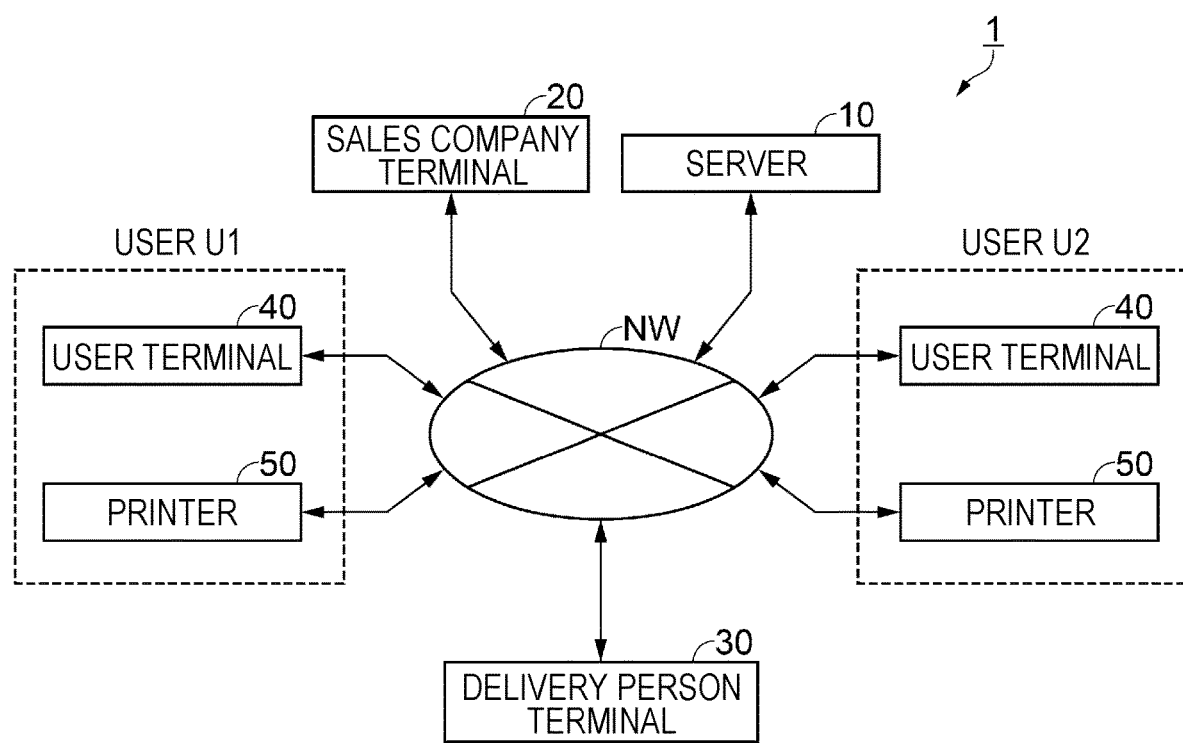
FIG. 1 is a configuration diagram showing an example of a schematic configuration of a cartridge provision system.

A cartridge provision system 1 as a provision system will be described below with reference to the drawings. FIG. 1 is a configuration diagram showing an example of a schematic configuration of the cartridge provision system 1 of this embodiment. As shown in FIG. 1, the cartridge provision system 1 includes a server 10, a sales company terminal 20, a delivery person terminal 30, one or a plurality of user terminals 40, and one or a plurality of printers 50, and these are connected to each other via a network NW such as the Internet.

The printers 50 are located at the location of one or more users who have entered into a predetermined maintenance contract with the sales company and are used by each of the users. The user terminals 40 are connected to the network NW for each of these users. FIG. 1 shows the user terminals 40 and the printers 50 used by a user U1 and a user U2, which correspond to one or more users. A cartridge 60 (see FIG. 2) containing ink or other liquid is installed in the printer 50, and the printer 50 prints using the liquid supplied from the cartridge 60. The server 10 manages provision of the cartridges 60 to the users, and collection of the cartridges 60 from the users. The cartridge 60 containing liquid may also be described simply as liquid. The liquid corresponds to the recording material. Thus, the cartridge 60 could also be described simply as recording material. The recording material may be solid toner or liquid toner used in electrophotographic recording devices. In that case, the cartridge 60 is a toner cartridge.

The sales company terminal 20 is a terminal device managed by the sales company, which sells cartridges 60, that is, a vendor, and is operated by a sales person in charge of sales. In this embodiment, this sales person is also in charge of managing the provision and collection of the cartridges 60. The delivery person terminal 30 is a terminal device operated by a delivery person of a delivery company that delivers the cartridge 60 to the user, and is carried by the delivery person when delivering, to the user, the cartridge 60 from a warehouse where an inventory of cartridges 60 is stored. The delivery company or the delivery person corresponds to a deliverer. The user terminal 40 is the terminal device operated by the user who manages the printer 50. Alternatively, the user may manually input the stock update information into management software, which is software that manages the receiving and shipping of the cartridge 60 and is installed on the user terminal 40. Hereinafter, the sales company terminal 20, the delivery person terminal 30, and the user terminal 40 are also referred to as terminal devices 20, 30, and 40, respectively. The server 10 is an information processing device that forms the core of the cartridge provision system 1. The server 10 accepts information input from each of the terminal devices 20, 30, and 40, and the printers 50, and performs processing according to said input. The server 10 outputs various types of information to each of the terminal devices 20, 30, and 40.

In this embodiment, the cartridge provision system 1 manages the inventory of the cartridge 60 held by the user along with the inventory of the cartridges 60 held by the sales company in order to prevent a cartridge 60 from being wastefully after its expiration date before it has been used. This cartridge provision system 1 allows the sales company of the cartridge 60 to provide the user with the appropriate cartridge 60 based on the expiration date or the like of the cartridges 60 held in inventory by the sales company and the user.

Figure 2:
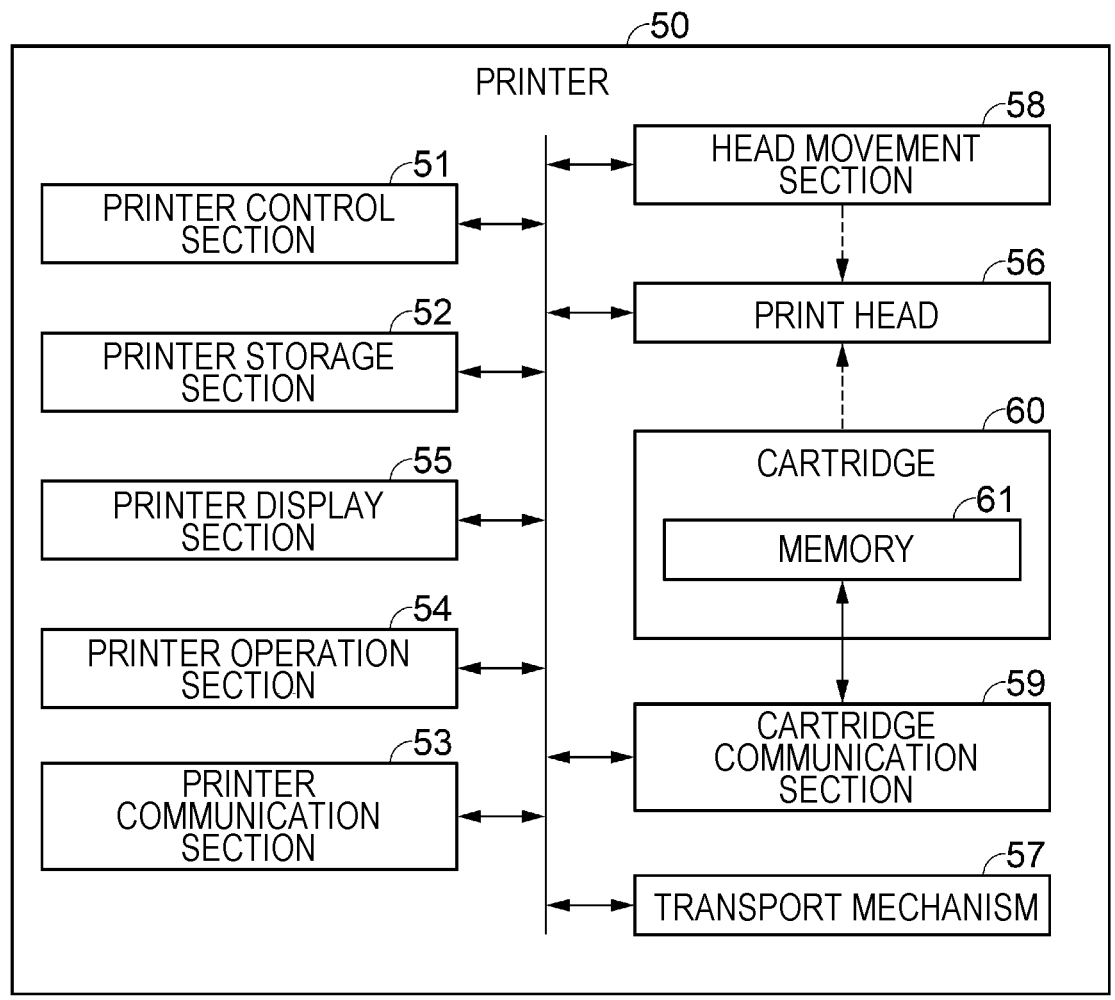
FIG. 2 is a block diagram showing an internal configuration of a printer.

Hereinafter, each of the devices comprising the cartridge provision system 1 will be described in detail. FIG. 2 is a block diagram showing the internal configuration of the printer 50. As shown in FIG. 2, the printer 50 has a printer control section 51, a printer storage section 52, a printer communication section 53, a printer operation section 54, a printer display section 55, a print head 56, a transport mechanism 57, a head movement section 58, and a cartridge communication section 59. In this embodiment, the printer 50 is an inkjet type image forming device (liquid ejection device) which forms an image, that is, prints, by ejecting ink, a liquid, from the print head 56. That is, the printer 50 corresponds to a recording device that performs recording by applying the recording material to a print medium (not shown), as medium.

The printer control section 51 is configured to include a processor such as a central processing unit (CPU), and controls an operation of the printer 50 by operating according to an operation program (not shown) stored in the printer storage section 52.

The printer storage section 52 is configured with a storage device such as a hard disk drive, a solid state drive (SSD), or a memory, and stores the aforementioned programs, various setting data, and the like.

The printer communication section 53 includes various interface circuitry for communicating with external devices. The printer communication section 53 of this embodiment includes interface circuitry for communication via the network NW.

The printer operation section 54 is configured with operation buttons or the like, and accepts input operations made by the user and transmits information regarding various instructions from the user to the printer control section 51. The printer display section 55 is configured with a liquid crystal display, an organic electro luminescence (EL) display, a light emitting diode (LED), or the like, and displays information or the like, based on the control of the printer control section 51. Note that the printer operation section 54 may be integral configuration of the printer display section 55, such as a touch panel.

The print head 56 has a plurality of nozzles (not shown) for ejecting ink. The print head 56 ejects liquid supplied from one or more cartridges 60 installed in the printer 50 onto the print medium under the control of the printer control section 51. Into the printer 50, for example, cartridges 60 containing inks of each color, such as cyan, magenta, yellow, and black, or a cartridge 60 containing a treatment liquid that coagulates or thickens components of the ink can be installed. This treatment liquid is ejected onto the print medium before or after the ink is ejected, for example, when the print medium is a woven fabric.

The transport mechanism 57 is controlled by the printer control section 51 so that the print medium may pass through where ink is ejected from the print head 56, and the head movement section 58 is controlled by the printer control section 51 to move the print head 56 reciprocally in a main scanning direction that intersects a transport direction.

The printer control section 51 performs a main scanning operation in which ink is ejected from the nozzles of the print head 56 while moving the print head 56 in the main scanning direction to form raster lines of dots along the main scanning direction on the print medium. By alternating this main scanning operation with the sub-scanning operation in which the print medium is moved along the transport direction, the printer control section 51 can eject ink over a wide area of the print medium. The printer control section 51 controls the above operation based on print data supplied from the user terminal 40, another computer (not shown), or the like, to form an image based on the print data on the print medium.

Each cartridge 60 has a non-volatile memory 61 attached to it. The memory 61 stores identification information to identify the individual cartridge 60, type information indicating the type of liquid contained in the cartridge 60, usage information indicating the amount of liquid used since the cartridge was first used, expiration information indicating the expiration date of use of the cartridge 60, and the like. The identification information is information for identifying the individual cartridge 60 and for updating an user inventory data 31 to be described later, and may include, for example, information regarding at least one of a product name, an individual manufacturing number, a manufacturing lot number, a manufacturer name, and a manufacturing plant number of the cartridge 60. The type information may include information regarding at least one of a color, a dye, and a pigment of the liquid contained in the cartridge 60. The expiration information may include date information regarding the expiration date to use the cartridge 60.

The cartridge communication section 59 connects to a coupling terminal (not shown) provided in the memory 61 of the cartridge 60. The printer control section 51 can read our information from the memory 61 or update the information stored in the memory 61 under the control of the printer control section 51. Whenever a print is executed, the printer control section 51 updates the usage information for each cartridge 60 by adding the usage amount of the liquid used this time to the usage amount of liquid indicated by the usage information stored in the memory 61. If the usage amount indicated by the updated usage information exceeds a predetermined threshold value, a message indicating that the cartridge 60 needs to be replaced is displayed on the printer display section 55.

Among the information stored in the memory 61 of the cartridge 60, the identification information, the type information, and the expiration information are also written on a package of cartridge 60. Therefore, the user can recognize the identification information, the type information, and the expiration information by viewing the package. Further, it is desirable that at least the identification information among this information should also be indicated on the package in the form of a barcode or the like. In this case, the individual cartridge 60 can be identified by reading the barcode or the like. In this case, the identification information, the type information, and the expiration information may each be indicated by a different one-dimensional code, or all of the identification information, the type information, and the expiration information may be indicated by a single two-dimensional code.

Figure 3:
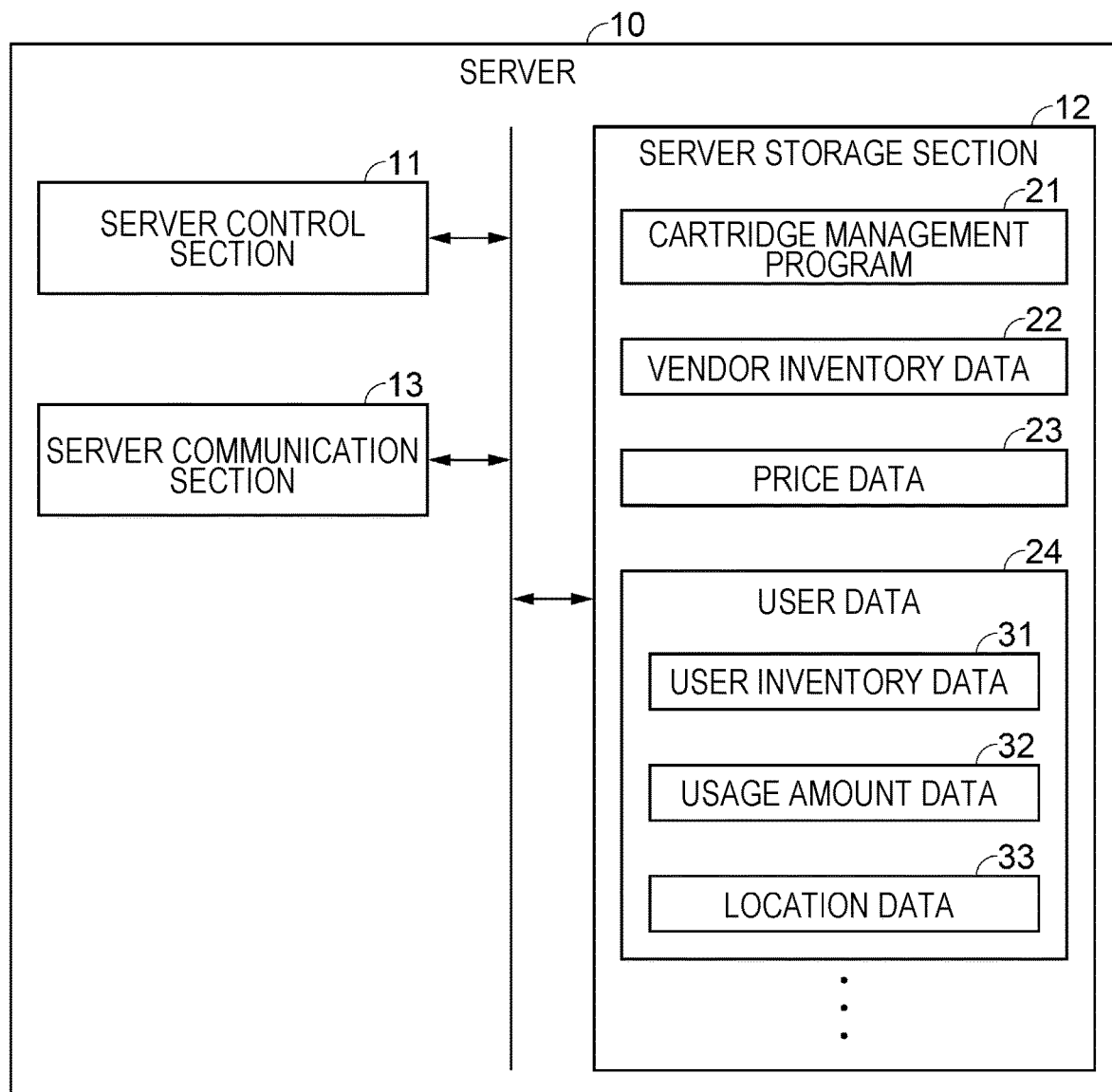
FIG. 3 is a block diagram showing an internal configuration of a server.

FIG. 3 is a block diagram showing an internal configuration of the server 10. As shown in FIG. 3, the server 10 is configured, for example, by a general-purpose computer, and has a server control section 11, a server storage section 12, and a server communication section 13. The server storage section 12 and the server communication section 13 are connected to the server control section 11 via a bus or the like.

The server control section 11 is configured to include a processor, such as a CPU, and a memory, such as a random access memory (RAM), or a read only memory (ROM). The server control section 11 controls an operation of the server 10 by operating in accordance with an operating system (OS) and various application programs (not shown) stored in the server storage section 12, and also executes various operations in response to requests from the clients, that is, the terminal devices 20, 30, and 40 and the printers 50.

The server storage section 12 is configured by a storage device such as a hard disk drive or an SSD, and stores the OS and the various application programs, as described above. The application programs stored in the server storage section 12 include a cartridge management program 21 that manages the provision and collection of the cartridges 60. The server storage section 12 in this embodiment also stores an inventory of cartridges 60 held by the sales company, that is, vendor inventory data 22 in which the inventory of cartridges 60 stored in the warehouse of the sales company is registered, and the price data 23 in which the price of cartridge 60 is registered. The server storage section 12 further stores user data 24 for each user who has signed the maintenance contract described above.

The user data 24 includes user inventory data 31 in which the inventory of cartridges 60 held by the user is registered, usage amount data 32, which indicates the usage amount of the cartridges 60 for each type of liquid in the printer 50, for example, for each color of liquid, and location data 33, which indicates the location of the user. For each of the user inventory data 31, the usage amount data 32, and the location data 33 regarding one user, an identifier is assigned to identify that one user. In other words, the user inventory data 31, the usage amount data 32, and the location data 33 regarding one user are associated with each other by the identifier to identify the user.

In this embodiment, inventory of the cartridges 60 held by the user means the inventory stored in a warehouse or other location at or near the user's location where the printer 50 is installed. However, ownership of that inventory is retained by the vendor, that is, the sales company. Therefore, the sale is not completed when the sales company delivers the cartridge 60 to the user's location. The sale is completed when the user installs the cartridge 60, which is stored as the inventory at the user's location or the like, into the printer 50.

As described above, the inventory of the cartridge 60 held by the sales company and by the user are registered in the vendor inventory data 22 and the user inventory data 31, respectively. Specifically, in the vendor inventory data 22 and the user inventory data 31, the identification information to identify each of the individual cartridges 60 in inventory is registered, and each type of identification information is associated with the type information that indicates the type of liquid and the expiration information that indicates the expiration date to use. Therefore, by referring to the vendor inventory data 22 and user inventory data 31, the server 10 can recognize each of the inventory of sales company and the inventory of the user as inventory amount by the liquid type or by the expiration date. Further, each type of identification information registered in the user inventory data 31 is associated with start of holding information indicating a start of holding date.

The price data 23 is a table that indicates correspondence between the time elapsed since the cartridge 60 was manufactured and the price of the cartridge 60. Specifically, the price data 23 is set so that the longer the elapsed time since manufacture, in other words, the shorter the time until the expiration date, the lower the price. This enables the user to select the cartridge 60 with the shorter expiration date when replacing the cartridge 60, if there are multiple cartridges 60 of the same type as the cartridge 60 to be replaced.

The usage amount data 32 is data indicating the liquid usage amount within a certain period of time. In other words, the usage amount data 32 is data that indicates an amount of liquid used or an actual usage of liquid in the printer 50. Therefore, the usage amount data 32 may be referred to as actual usage data. In the usage amount data 32, usage amounts at multiple points in time from the past to the present are totaled, resulting in a record of temporal trends in the amount of liquid used. In this embodiment, the usage amount data 32 is data indicating the number of times the cartridge 60 is replaced per month, and the number of replacements is totaled for each type of liquid. In the usage amount data 32, the number of replacement times over multiple months up to the present is recorded for each type of liquid. In this embodiment, the value of the number of replacement times is the same as the value of the number of cartridges 60 used per month. For example, if the number of the cartridges 60 used per month is two, the number of the replacement times for the cartridges 60 used per month is two. The number of replacement times may be calculated to be different from the number of cartridges 60 used per month. For example, if one unit of operation of "replacement" is to remove the cartridge 60 installed in the printer 50 and install a new cartridge 60 of the same type in the printer 50 during a month, the number of cartridges 60 used per month is two but the number of replacement times is one.

The server communication section 13 is provided with various interface circuitry for communication with external devices. The server communication section 13 in this embodiment includes interface circuitry for communication via the network NW, and can communicate with each of the terminal devices 20, 30, and 40 and the printers 50 via the network NW.

When the cartridge management program 21 is activated, the server control section 11 manages the vendor inventory data 22, the price data 23, the user inventory data 31, the usage amount data 32, and the location data 33 stored in the server storage section 12. When there are multiple users, the server control section 11 manages the user inventory data 31, the usage amount data 32, and the location data 33 for each of the multiple users. The term "manage" here includes reading, using, and updating the data. The server storage section 12 need not be integrated with the server 10, but may be configured with an external storage device that can be accessed from the server 10 via the network NW. In other words, the server 10 should have at least the server control section 11 and the server communication section 13. Since the server 10 has the server control section 11 that manages the various data described above, the server 10 corresponds to a management device.

Figure 4:
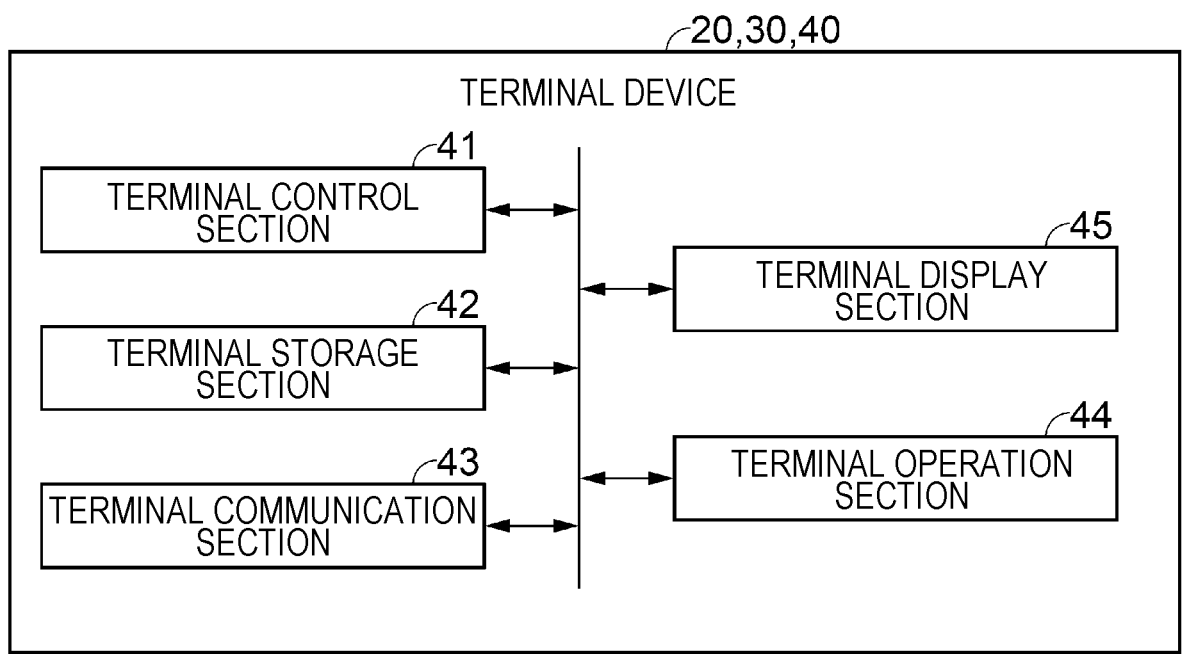
FIG. 4 is a block diagram showing an internal configuration of a terminal device.

FIG. 4 is a block diagram showing an internal configuration of each of the terminal devices 20, 30, and 40. As shown in FIG. 4, the terminal devices 20, 30, and 40 are configured by a personal computer, a tablet-type portable terminal, or the like. The terminal devices 20, 30, and 40 include a terminal control section 41, a terminal storage section 42, a terminal communication section 43, a terminal operation section 44, and a terminal display section 45.

The terminal control section 41 is configured with a processor such as a CPU and a memory such as a RAM or a ROM, and controls the operations of the terminal devices 20, 30, and 40 by operating in accordance with an OS and various application programs stored in the terminal storage section 42 (not shown). The terminal storage section 42 is configured with a storage device such as a hard disk drive, an SSD, or a memory, and stores various data and the like, in addition to the OS and the various application programs described above. The terminal communication section 43 has various interface circuitry for communication with external devices. The terminal communication section 43 in this embodiment includes interface circuitry for communication via the network NW.

The terminal operation section 44 is configured with a keyboard, a pointing device, and the like, and accepts input operations made by each person in charge or the user, and transmits the input operations to the terminal control section 41. The terminal display section 45 is configured by a liquid crystal display, an organic EL display, or the like, and displays information and the like based on the control of the terminal control section 41. The terminal operation section 44 may be an integral configuration with the terminal display section 45, such as a touch panel. Further, the terminal operation section 44 and the terminal display section 45 may be separated from the main body of the terminal devices 20, 30, and 40, as in a desktop computer.

As described above, the terminal devices 20, 30, and 40 may be desktop or notebook personal computers, or they may be mobile terminals. However, since the delivery person terminal 30 is a terminal device carried by the delivery person during delivery, it is assumed that the delivery person terminal 30 is a mobile terminal. Each terminal device 20, 30, and 40 is not limited to general-purpose devices, and may be dedicated devices for the cartridge provision system 1.

Figure 5:
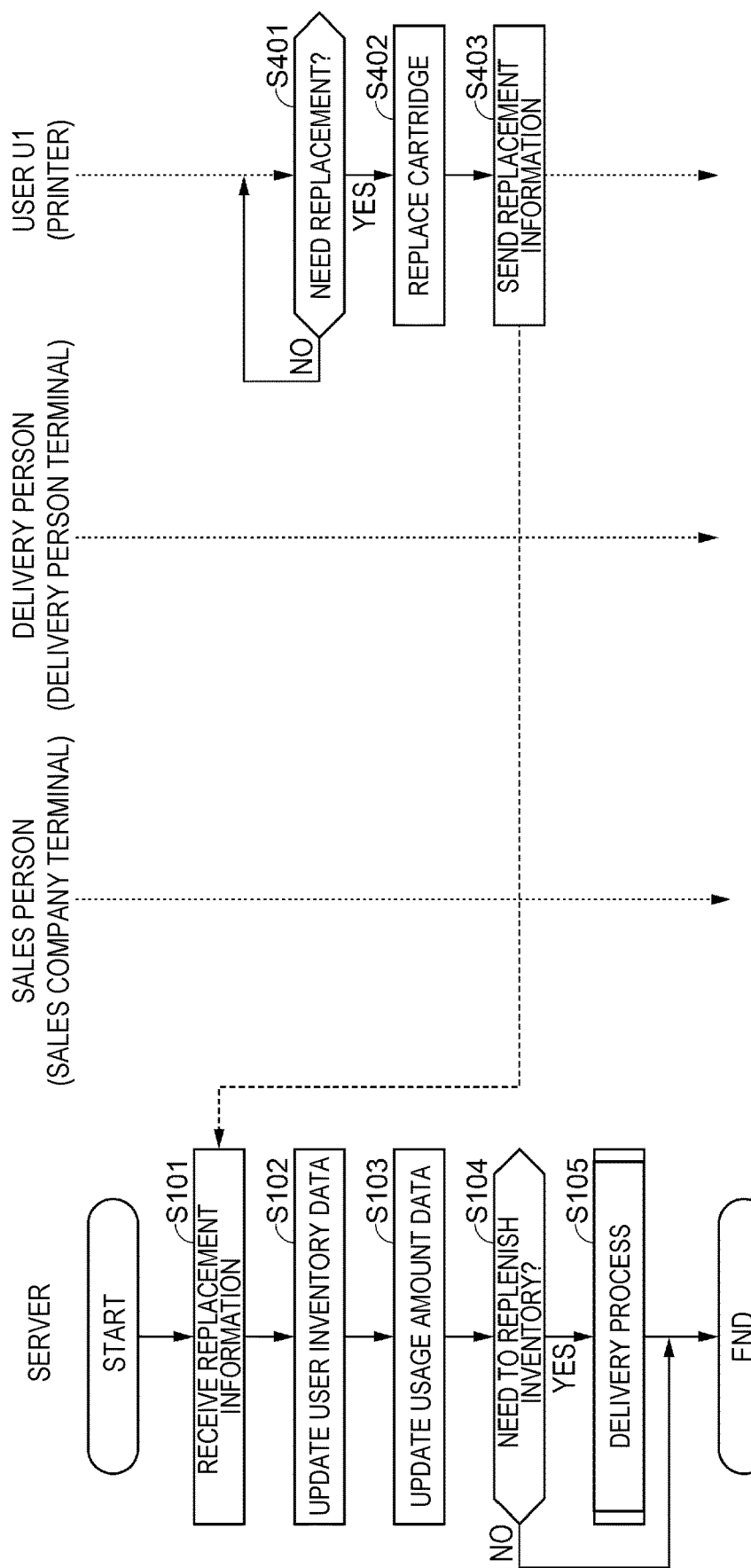
FIG. 5 is a flow chart for explaining a provision method of the cartridge.
Figure 6:
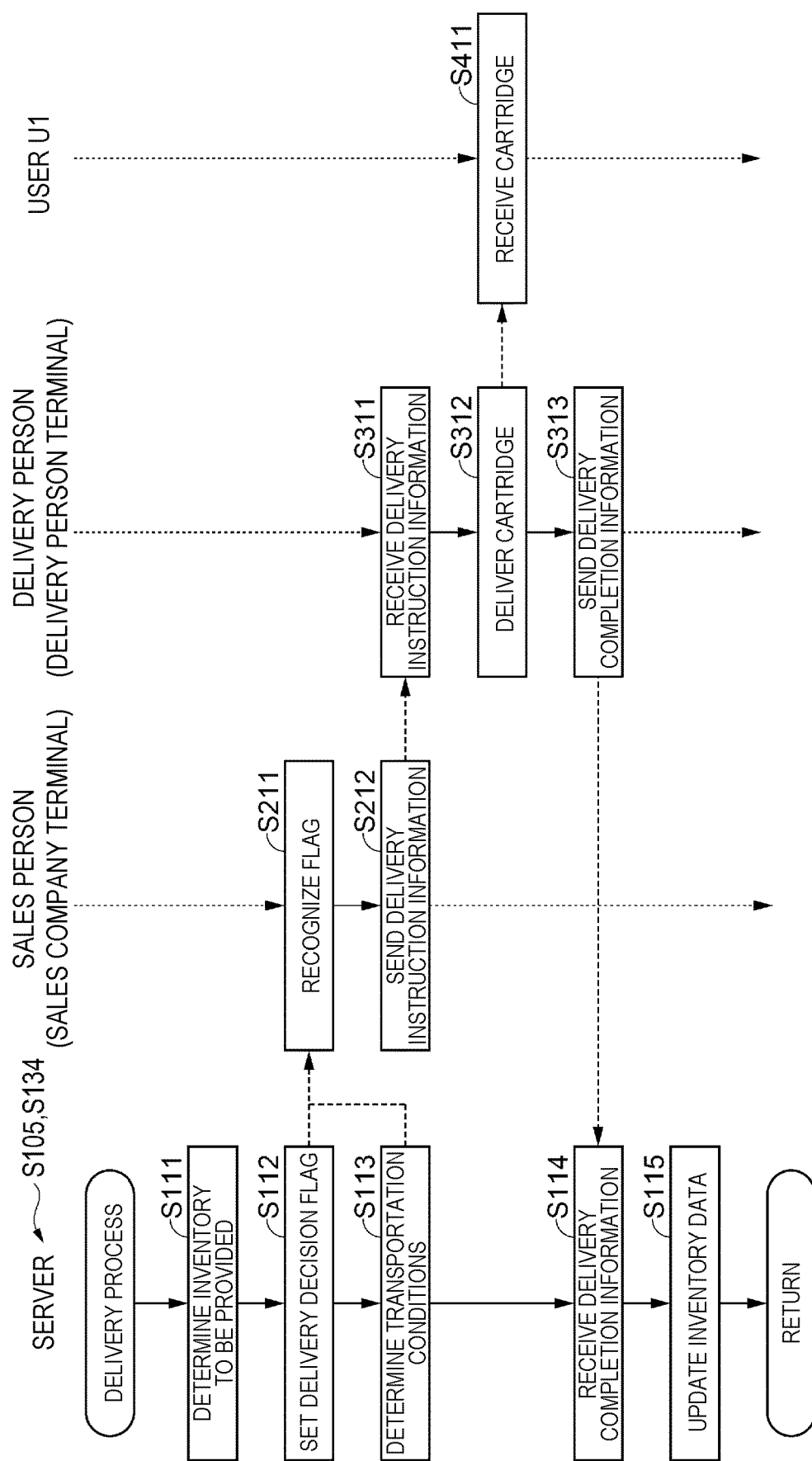
FIG. 6 is a flowchart for explaining a delivery process.

Next, a provision method of cartridge 60 using the cartridge provision system 1 will be described. FIG. 5 is a flowchart for explaining the provision method of cartridge 60, and FIG. 6 is a flowchart for explaining a delivery process included in the provision method of cartridge 60. These flowcharts include steps S101 to S115, which show operations of the server 10, steps S211 to S212, which show operations of the sales person of the sales company and the sales company terminal 20, and steps S311 to S313, which show operations of the delivery person of the delivery company and the delivery person terminal 30. The flowchart also includes steps S401 to S411, which show the operations of the user U1 and the operations of the printer 50 of user 1 from among one or more users.

As shown in FIG. 5, the user U1 using the printer 50 determines whether any of the cartridges 60 need to be replaced based on a message displayed on the printer display section 55 (step S401). If none of the cartridges 60 need to be replaced (step S401: NO), this step S401 is repeated while continuing to use the printer 50.

On the other hand, if any of the cartridges 60 needs to be replaced (step S401: YES), that is, if the message is displayed on the printer display section 55 indicating that a cartridge 60 needs to be replaced, the user U1 performs the replacement of the cartridge 60 (step S402). Specifically, the user U1 removes the cartridge 60 to be replaced from the cartridges 60 installed in the printer 50. Then, from among the cartridges 60 held in inventory, the same type of cartridge 60 that is to be replaced is installed in the printer 50. At this time, if there are multiple cartridges 60 of the same type to be replaced in the inventory, the user U1 selects the one with the shortest time period until the expiration date among them, and installs the selected cartridge 60 in the printer 50.

When the cartridge 60 is replaced by the user U1, the printer control section 51 reads out the identification information and the type information from the memory 61 of the newly installed cartridge 60 using the cartridge communication section 59. The printer control section 51 then sends the read-out identification information and type information, as replacement information indicating that the cartridge 60 has been replaced, from the printer communication section 53 to the server 10 (step S403).

The server control section 11 of the server 10 receives the replacement information sent from the printer 50 of the user U1 by the server communication section 13 (step S101). The server control section 11 recognizes the individual cartridge 60 installed in the printer 50 based on the cartridge 60 identification information included in the received replacement information. The server control section 11 updates the user inventory data 31 of the user U1 so that the number of cartridges 60 of the same type as the replaced target is reduced by one, by deleting data of the installed cartridge 60 from the inventory in the user inventory data 31 of the user U1 (step S102). Initial data for the user inventory data 31 may be provided by the user to the sales company, and then the server control section 11 may retrieve this provided data as the initial data. The initial data of the user inventory data 31 is data that shows the inventory status at the time the user introduced the cartridge provision system 1.

The server control section 11 also updates the usage amount data 32, which indicates the usage amount of the cartridge 60, based on the received replacement information (step S103). Specifically, the server control section 11 increases by one the number of replacement times during this month, for the cartridge type indicated by the type information included in the received replacement information.

Next, the server control section 11 determines, based on the user inventory data 31 and the usage amount data 32 of the user U1, whether the inventory needs to be replenished, that is, whether the cartridge 60 need to be provided, due to the fact that the inventory of the user U1 has decreased by one (step S104). For example, the server control section 11 derives an appropriate amount of inventory that the user U1 should hold based on the usage amount data 32 of the user U1, and determines that it is necessary to provide the cartridge 60 when the inventory amount based on the user inventory data 31 is less than the appropriate inventory amount. If the server control section 11 determines that the provision of the cartridge 60 is necessary (step S104: YES), the server control section 11 executes a delivery process (step S105) described below, and if the server control section 11 determines that the provision of the cartridge 60 is not necessary (step S104: NO), the server control section 11 ends the flow. In step S104, the user U1, not the server control section 11, may determine whether the inventory needs to be replenished. If the user U1 determines that the inventory needs to be replenished, for example, the user U1 enters order information on the user terminal 40 of the user U1 to place an order for cartridge 60. The order information is then sent to the server 10 via the network NW.

Next, the details of the delivery process (step S105) are described with reference to FIG. 6. As shown in FIG. 6, first, the server control section 11 determines which cartridge 60 should be provided to the user U1 from the inventory held by the sales company, based on the vendor inventory data 22, the user inventory data 31, the usage amount data 32, and the location data 33 of the user U1 (step S111). Specifically, the server control section 11 determines which expiration date of cartridge 60 should be provided from the inventory held by the sales company. For example, the server control section 11 determines that a user with relatively low usage amount per month should be provided with a cartridge 60 with a relatively long time period until the expiration date so that the cartridge 60 will not be wasted without being used by its expiration date. On the other hand, for a user with a relatively high usage amount per month, the server control section 11 may determine that a cartridge 60 with a relatively short time period until its expiration date should be provided. Further, the server control section 11 determines that a user with a relatively long distance from the warehouse where the inventory of the sales company is stored to the location of the user should be provided with a cartridge 60 with a relatively long time period until the expiration date, in consideration of the time required for delivery.

Once the cartridge 60 expiration date to be provided has been determined, to one of the cartridges 60 in the vendor inventory data 22 having the determined expiration date, the server control section 11 sets at least one of a delivery decision flag or a delivery decision code indicating that it is the cartridge 60 to be delivered (S112), and assigns at least one of an identifier or identification code indicating the user to which it is to be delivered. The delivery decision flag and the delivery decision code are symbols that distinguish the cartridge 60 to be delivered from the other cartridges 60. Similarly, the identifier and the identification code are symbols that enable the server control section 11 to recognize the user to whom the delivery is to be made.

Next, the server control section 11 determines transportation conditions when the delivery company delivers the cartridge 60 (step S113), and assigns an identifier indicating the transportation conditions to the data, that is, to the record, of the cartridge 60 to which the delivery decision flag has been set in the vendor inventory data 22. For example, the server control section 11 can specify, as the transportation conditions, low temperature transportation, indication to not turn upside down, marking as fragile, strictly prohibiting placement in the bottom of a stack, or the like. However, an initial setting (default conditions) for these transportation conditions is predetermined according to the type of liquid. The server control section 11 changes these initial transportation conditions to actual conditions based on the season when the delivery is to be made, the location of the user to whom the delivery is to be made, and the time period until the expiration date of the cartridge 60 to be delivered. For example, even if the initial setting is normal temperature transportation, the transportation conditions may be changed to the low temperature transportation if at least one of the following conditions is applied: the delivery is to be made during a hot season, the location is far away, or the time period until the expiration date is short. Then, the server control section 11 sends a notification to the sales company terminal 20 indicating that at least one of the delivery decision flag or the delivery decision code has been set.

Based on the notification from the server 10, the sales person recognizes that the delivery decision flag has been set, that is, that there is a cartridge 60 that has to be delivered (step S211). The sales person accesses the server 10 from the sales company terminal 20 and obtains from the vendor inventory data 22 the identification information of the cartridge 60 for which the delivery decision flag has been set, the identifier indicating the user to whom the delivery is to be made, and the identifier indicating the transportation condition. Then, the sales person sends delivery instruction information based on the obtained information from the sales company terminal 20 to the delivery person terminal 30 (step S212).

When the delivery person terminal 30 receives this delivery instruction information from the sales company terminal 20 (step S311), the delivery person delivers the cartridge 60 to the user U1 (step S312). Specifically, the delivery person receives the designated cartridge 60 at the sales company's warehouse, and delivers this cartridge 60 to the location of the user U1 according to the specified transportation conditions. The user U1 receives the delivered cartridge 60 from the delivery person (step S411) and stores the cartridge 60 in a designated place as inventory. When the delivery is completed, the delivery person sends delivery completion information from the delivery person terminal 30 to the server 10 indicating that the delivery of the cartridge 60 to the user U1 is completed (step S313).

When the server 10 receives the delivery completion information from the delivery person terminal 30 (step S114), the server control section 11 updates the vendor inventory data 22 and the user inventory data 31 of the user U1 (step S115). Specifically, the server control section 11 updates the vendor inventory data 22 by deleting data regarding the cartridge 60 delivered to the user U1 from the vendor inventory data 22. For example, the server control section 11 updates the vendor inventory data 22 so that the number of inventory of the cartridge 60 that is the same type of the cartridge 60 delivered to the user U1 is decreased by one. The server control section 11 also updates the user inventory data 31 of the user U1 to add the delivered cartridge 60 to the user inventory data 31 and to enter the delivered date of this cartridge 60 as the start of holding date of this cartridge 60. Accordingly, the delivery process (step S105) is completed, and the server control section 11 returns to the main flow shown in FIG. 5 and then ends the flow.

Figure 7:
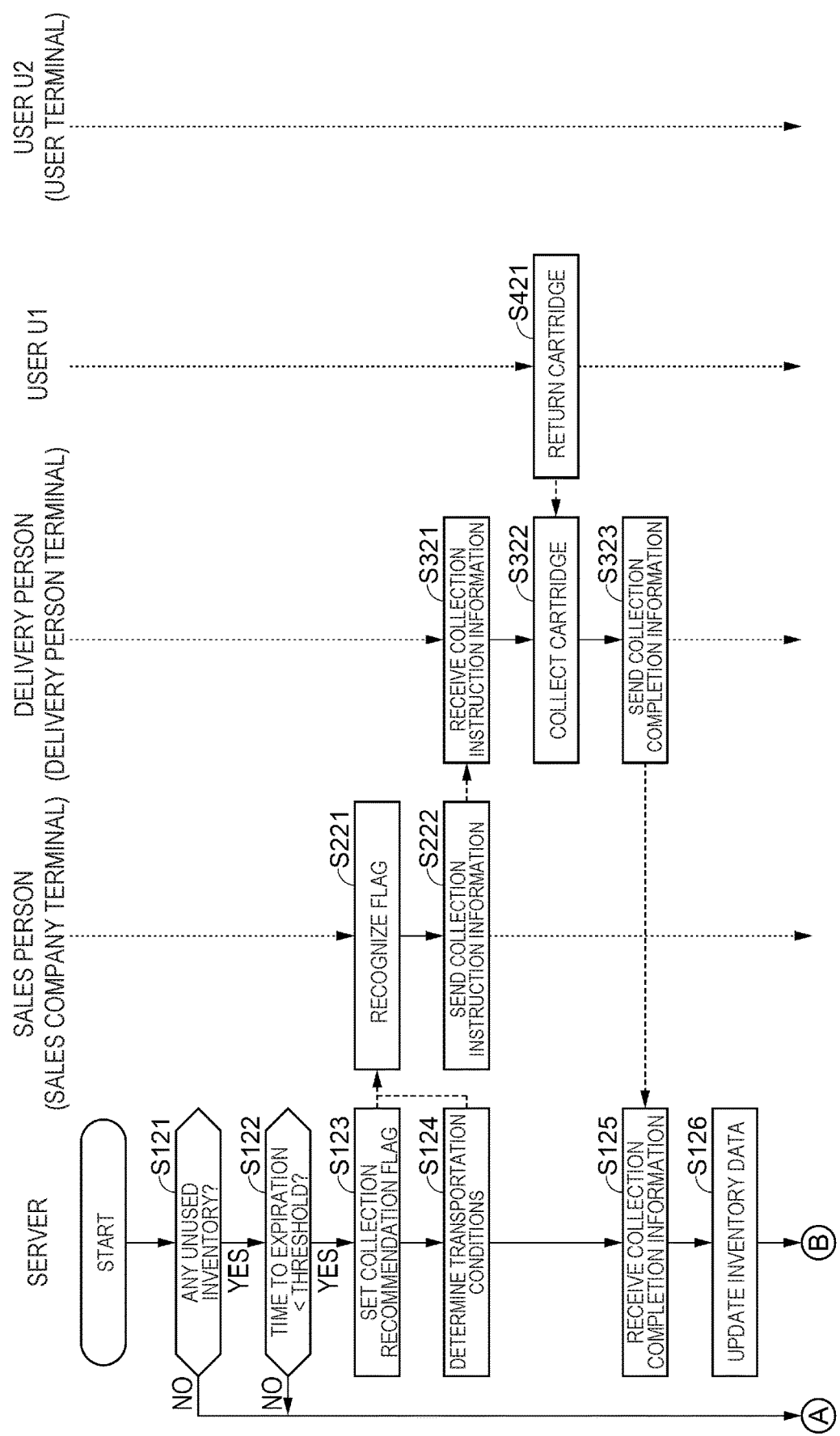
FIG. 7 is a flowchart for explaining an inventory management process.
Figure 8:
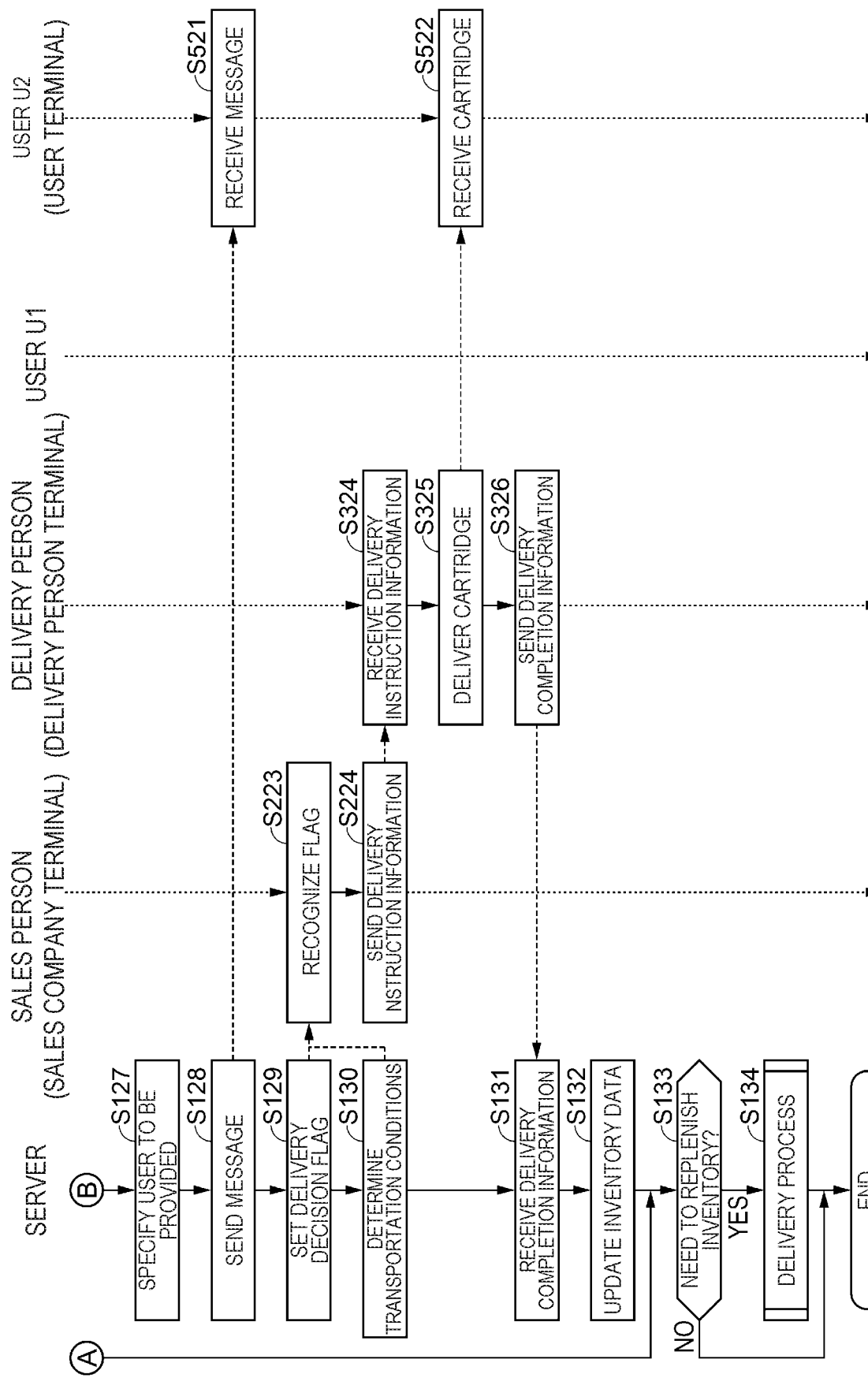
FIG. 8 is another flowchart for explaining the inventory management process.

Next, an inventory management process that the server 10 performs periodically in the provision method for the cartridge 60 will be described. FIGS. 7 and 8 are flowcharts for explaining the inventory management process. These flowcharts include steps S121 to S134, which show operations of the server 10, steps S221 to S224, which show operations of the sales person of the sales company and the sales company terminal 20, and steps S321 to S326, which show operations of the delivery person of the delivery company and the delivery person terminal 30. The flowcharts also include step S421, which shows an operation of the user U1, and steps S521 and S522, which show operations of the user U2 and operations of the user terminal 40 of the user U2, among the multiple users. The server control section 11 of the server 10 starts the following flow triggered when the current time, as counted by a timer (not shown), reaches a predetermined time on a predetermined date and time.

First, the server control section 11 determines, based on the user inventory data 31 for all users, whether there is any unused inventory of the cartridges 60 in the inventory held by any user that has not been used for a predetermined period of time since the user started holding them (step S121). Here, the predetermined period of time is set to be shorter than the period of time between when the cartridge 60 was manufactured and its expiration date. This predetermined period corresponds to a first period, and the unused inventory corresponds to unused recording material. If none of the users has unused inventory (step S121: NO), the server control section 11 proceeds to step S133. The manufacturing period of the cartridge 60 means the period when the liquid contained in the cartridge 60 is manufactured, when the liquid is filled into the cartridge 60, and so on.

On the other hand, if any user has unused inventory (step S121: YES), the server control section 11 determines, based on the expiration date of the cartridge 60 determined to be the unused inventory, whether the time period from the current time, that is, the time when the cartridge is determined to be unused inventory, to the expiration date is less than a predetermined threshold value TH1 (step S122). Here, the threshold value TH1 correspond to a first threshold value. Here, users with a relatively high usage amount tend to have a shorter time period to use up a single cartridge 60 compared to users with a relatively low usage amount. Thus, the threshold value TH1 is set, for example, to a value smaller than a time period UP1 and larger than a time period UP2. The time period UP1 is the time period required for the user with a relatively low usage amount to use up a single cartridge 60, and the time period UP2 is the time period required for the user with a relatively high usage amount to use up a single cartridge 60. In this case, the time period UP1 is longer than the time period UP2. Specifically, for example, assuming that the time period UP1 required for the user with a relatively low usage amount to use up a single cartridge 60 is three months and the time period UP2 required for the user with a relatively high usage amount to use up a single cartridge 60 is one month, the threshold value TH1 will be two months. If the time period until the expiration date for any of the unused inventory is equal to or greater than the threshold value TH1 (step S122: NO), the server control section 11 proceeds to step S133.

On the other hand, if the time period until the expiration date for any of the unused inventory is less than the threshold value TH1 (step S122: YES), the server control section 11 sets a collection recommendation flag to the data, or the record, of the corresponding cartridge 60 in the user inventory data 31 of the user who holds that cartridge 60 (step S123). The collection recommendation flag is a flag indicating that the cartridge is likely to reach its expiration date without being used if the cartridge 60 continues to be held by the same user (the user with a relatively low usage mount). In other words, the collection recommendation flag indicates that there is a cartridge 60 that will be recommended, by the sales company, to be collected from the user with a relatively low usage amount and to be delivered to another user with a relatively high usage amount for his or her use. In the following description, it is assumed that the user U1 is the user who owns the cartridge 60 with the collection recommendation flag is set. In this case, the user U1 corresponds to a first user.

Next, the server control section 11 determines the transportation conditions when collecting the cartridge 60 in the same manner as in step S113 above (step S124), and assigns an identifier indicating the transportation conditions to the data of the cartridge 60 with the collection recommended flag set to the user inventory data 31 of the user U1. Thereafter, the server control section 11 sends a notification to the sales company terminal 20 indicating that the collection recommendation flag has been set.

Based on the notification from the server 10, the sales person recognizes that the collection recommendation flag has been set, that is, that there is a cartridge 60 to be collected (step S221). The sales person accesses the server 10 from the sales company terminal 20 and extracts the cartridge 60 that is set with the collection recommendation flag, that is, the cartridge 60 that is to be collected, from the user inventory data 31 of all the users. The sales person then obtains the identification information of the cartridge 60 to be collected, the identifier indicating the transportation conditions, and the identifier of the user who holds the cartridge 60 to be collected, and sends collection instruction information based on the obtained information from the sales company terminal 20 to the delivery person terminal 30 (step S222).

When the delivery person terminal 30 receives this collection instruction information from the sales company terminals 20 (step S321), the delivery person goes to the location of the user U1 to collect the cartridge 60 to be collected from the user U1 (step S322). In other words, the user U1 returns the cartridge 60 to be collected to the sales company via the delivery person (step S421). The delivery person transports the collected cartridge 60 back to the sales company's warehouse according to the specified transportation conditions, and then sends collection completion information indicating that the collection of the cartridge 60 is complete from the delivery person terminal 30 to the server 10 (step S323).

When the server 10 receives the collection completion information from the delivery person terminal 30 (step 125), the server control section 11 updates the user inventory data 31 of the user U1 and the vendor inventory data 22 (step S126). Specifically, the server control section 11 updates the user inventory data 31 by deleting the data of the collected cartridge 60 from the user inventory data 31 of the user U1. The server control section 11 also updates the vendor inventory data 22 by adding the data of the collected cartridge 60 to the vendor inventory data 22.

The collected cartridge 60 should be utilized by other users with high usage amount because the collected cartridge has a short time period until its expiration date. Therefore, the server control section 11 specifies the user to whom the collected cartridge 60, that is, the cartridge 60 with the collection recommendation flag set, should be provided based on the user inventory data 31, the usage amount data 32, and the location data 33 for all the users (step S127). For example, the server control section 11 specifies a user with a relatively high usage amount of the same type of liquid as the collected cartridge 60 and with a relatively small inventory amount of that type of cartridge 60, as the user to whom the collected cartridge will be provided. If there are multiple users with similar levels of the usage amount and the inventory amount, for example, a user with a relatively short distance from the warehouse to the location of the user is specified as the user to whom the collected cartridge will be provided. In the following description, it is assumed that a user U2, who is different from the user U1, is specified as the user to whom the collected cartridge will be provided. In this case, the user U2 corresponds to a second user.

Once the user to whom the cartridge 60 is to be provided is specified, the server control section 11 sends a message to the user terminal 40 of the specified user, the user U2, indicating that there is unused inventory that can be provided to the user U2 and that this unused inventory is scheduled to be sent (step S128). When the user terminal 40 of the user U2 receives this message (step S521), the user U2 recognizes that a cartridge 60 with the shorter time period until its expiration date will be delivered in the near future.

Next, to the data of the collected cartridge 60 in the vendor inventory data 22, the server control section 11 sets the delivery decision flag indicating that the cartridge 60 should be delivered (step S129) and assigns an identifier indicating the specified user to whom the cartridge 60 will be provided.

Next, as in step S113, the server control section 11 determines transportation conditions for delivering the cartridge 60 (step S130), and assigns an identifier indicating the transportation conditions to the data of the cartridge 60 for which the delivery decision flag has been set in the vendor inventory data 22. Then, the server control section 11 sends a notification to the sales company terminal 20 indicating that the delivery decision flag has been set.

Based on the notification from the server 10, the sales person recognizes that the delivery decision flag has been set, that is, that there is a cartridge 60 to be delivered (step S223). The sales person accesses the server 10 from the sales company terminal 20 and obtains from the vendor inventory data 22 the identification information of the cartridge 60 to which the delivery decision flag has been set, the identifier indicating the user to whom the delivery is to be made, and the identifier indicating the transportation condition. Then, delivery instruction information based on this obtained information is sent from the sales company terminal 20 to the delivery person terminal 30 (step S224).

When the delivery person terminal 30 receives the delivery instruction information from the sales company terminals 20 (step S324), the delivery person delivers the cartridge 60 to be delivered to the user U2 (step S325). Specifically, the delivery person receives the collected cartridge 60 from the user U1 at the warehouse of the sales company, and delivers that cartridge 60 to the location of the user U2 according to the specified transportation conditions. The user U2 receives the delivered cartridge 60 from the delivery person (step S522), and stores this cartridge in a designated place as inventory. When the delivery is completed, the delivery person sends delivery completion information indicating that the delivery to the user U2 is complete from the delivery person terminal 30 to the server 10 (step S326).

When the server 10 receives the delivery completion information from the delivery person terminal 30 (step S131), the server control section 11 updates the vendor inventory data 22 and the user inventory data 31 of the user U2 (step S132). Specifically, the server control section 11 updates the vendor inventory data 22 by deleting the data for the cartridge 60 delivered to the user U2 from the vendor inventory data 22. The server control section 11 updates the user inventory data 31 of the user U2 to add the data of the delivered cartridge 60 to the user inventory data 31 and to enter the delivered date of the cartridge 60 as the start of holding date of the cartridge 60.

Thereafter, the server control section 11 determines whether there are any users who need to replenish their inventory based on the user inventory data 31 and the usage amount data 32 for all users, including the user U1 from whom the cartridge 60 was collected (step S133). If there is a user whose inventory should be replenished, that is, a user who has a low amount of inventory relative to recent usage amount (step S133: YES), the delivery process (step S134) is performed, and the flow is ended. This delivery process is the same as the delivery process performed in step S105. On the other hand, if there is no user who needs inventory replenished (step S133: NO), the flow is ended without performing the delivery process. The server control section 11 periodically executes the flow of steps S121 to S134 in a predetermined cycle. However, the flow of steps S121 to S134 may be executed irregularly, triggered by specified events.

As described above, when a cartridge needs to be replaced, each user selects one of the cartridges of the same type as the cartridge 60 to be replaced from his own inventory and installs the selected cartridge 60 in the printer 50. At this time, the user will willingly select the cartridge 60 with the shorter time period until the expiration date because the price is set lower for the cartridge 60 with the shorter time period until the expiration date. In particular, since the cartridge 60 delivered as unused inventory has a short time period until its expiration date, this cartridge 60 is likely to be subject to immediate use after delivery.

Although omitted from FIG. 5, when a cartridge 60 is replaced by the user and the replacement information is sent from the printer 50 to the server 10, the server control section 11 determines the price of the cartridge 60 that has been started to be used based on the time when the replacement information was received, that is, when use of the new cartridge 60 started and based on price data 23 stored in the server storage section 12, and bills the user. The same applies when the unused inventory collected from the user U1 is used by the user U2. However, the price data 23 may be set such that the price of a regular cartridge 60 is different from the price of the unused inventory. Specifically, for the cartridges 60 with the same expiration date, the price of the unused inventory is set lower than the price of the regular cartridge 60. Thus, it is possible to promote the use of the unused inventory and reduce the number of cartridges 60 that are wastefully disposed of.

As described above, the following effects can be obtained in this embodiment.

(1) According to this embodiment, the server 10 manages not only the inventory held by the sales company, but also the inventory held by the user, and each inventory is associated with an expiration date. Accordingly, this system can determine the cartridges 60 from the sales company's inventory with which expiration dates should be provided to the user, depending on the inventory amount held by the user and the respective expiration dates of the cartridges 60. As a result, it is possible to reduce the number of cartridges 60 that are not used up by the expiration date and are disposed of wastefully by the end of the expiration date.

(2) According to this embodiment, the server 10 determines cartridges 60 with which expiration date should be provided to the user from the sales company's inventory based on the usage amount data 32 indicating the cartridge 60 usage amount. Accordingly, it is possible to reduce the number of cartridges 60 that are wastefully disposed of by providing inventory with a shorter time period until the expiration date to the user with a high usage amount.

(3) According to this embodiment, the server 10 updates the vendor inventory data 22 and the user inventory data 31 after it is confirmed that the delivery of the cartridge 60 to the user or the collection of the cartridge 60 from the user has been completed. Accordingly, inaccuracies in the vendor inventory data 22 and the user inventory data 31 due to delivery errors and the like are suppressed.

(4) According to this embodiment, in the vendor inventory data 22, the identifier indicating the transportation conditions is assigned to the cartridge 60 to be delivered or collected, so that the appropriate transportation conditions can be instructed to the delivery person.

(5) According to this embodiment, in the user inventory data 31, the server 10 sets the collection recommendation flag to the cartridge 60 that has a short time period until the expiration date among the unused inventory that has not been used for a long time. Accordingly, it is possible to easily specify the cartridge 60 that should be collected for use by other users or the like, and to reduce the number of cartridges 60 that are disposed of wastefully.

(6) According to this embodiment, the server 10 specifies, based on the usage amount data 32, the user to whom the unused inventory with the collection recommendation flag should be provided. Accordingly, it is possible to have the unused inventory used by a user who recently has a high usage amount, and to reduce the number of cartridges 60 that are disposed of wastefully.

(7) According to this embodiment, the price of the cartridge 60 is determined according to the time that has elapsed since the cartridge 60 was manufactured. Thus, even if the cartridge 60 has been in the unused inventory for a long period of time after it was manufactured, it is possible to promote the use of the cartridge 60.

(8) According to this embodiment, the user to whom should be provided unused inventory that was set with the collection recommendation flag is specified based on the location data 33. Therefore, it is possible to have the unused inventory used by a user whose location is close the deliverer, that is, the user whose delivery does not take a long time, and to reduce the number of cartridges 60 that are disposed of wastefully.

(9) According to this embodiment, when the server 10 provides the cartridge 60 to the user, the server 10 determines, based on the user's location, the cartridge 60 with which expiration date should be provided from the sales company's inventory. Accordingly, it is possible to suppress delivery of a cartridge 60 with a short time period until the expiration date to the user whose location is distant and whose delivery takes more time, and reduce the number of cartridges 60 that are disposed of wastefully.

(10) According to this embodiment, the server 10 sends a message to the user U2 indicating that there is unused inventory that can be provided, so that the user U2 can be made aware of this.

2. Second Embodiment

The cartridge provision system 1 of this embodiment is different from the first embodiment in the operation when setting the collection recommendation flag. Other configurations and operations are the same as in the first embodiment, and descriptions of them are omitted.

The cartridge provision system 1 in this embodiment first extracts the cartridge 60 that has a relatively short time period until the expiration date based on the user inventory data 31 of all the users. If the user who is holding this extracted cartridge 60 is a user with a relatively low usage amount of cartridges 60 of the same type as the extracted cartridge 60, then the collection recommendation flag is set to this extracted cartridge 60. In other words, even if the extracted cartridge 60 has a relatively short time period until its expiration date, if the user holding this cartridge has a relatively high usage amount of cartridges 60 that are the same type as the extracted cartridge 60, the collection recommendation flag is not set for the extracted cartridge 60.

Figure 9:
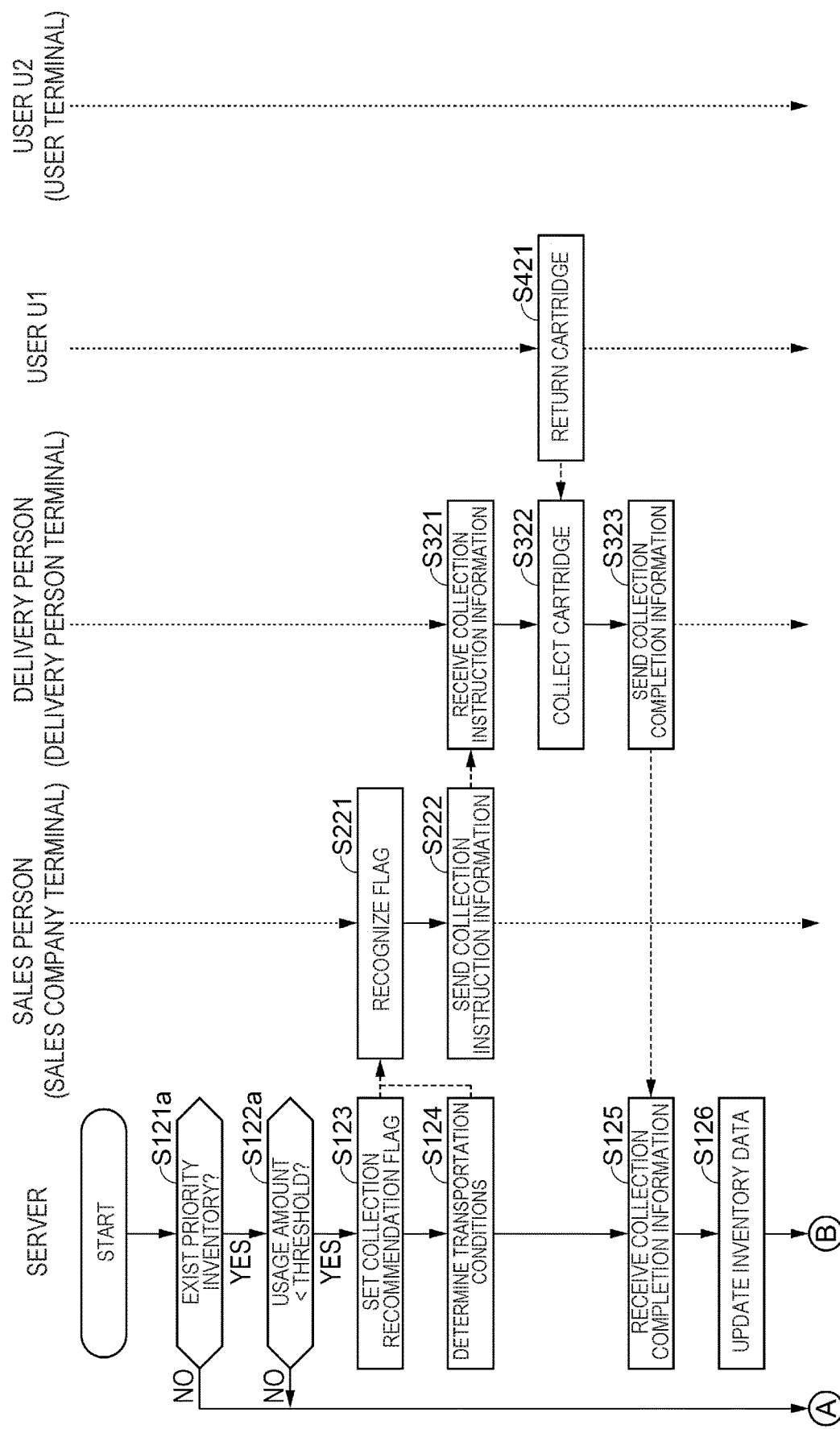
FIG. 9 is a flowchart for explaining the inventory management process in a second embodiment.

FIG. 9 is a flowchart for explaining the inventory management process in a second embodiment. Same as in the first embodiment, the server control section 11 starts the following flow, for example, triggered when the current time becomes a predetermined time at a predetermined date and time. As shown in FIG. 9, first, the server control section 11 determines, based on the user inventory data 31 of all the users, whether there exists in the inventory held by any user a cartridge 60 whose time period from the present time to the expiration date is less than a predetermined threshold value TH1, that is, a priority inventory that should be used on a priority basis (step S121a). The priority inventory corresponds to the priority recording material. If none of the users has priority inventory (step S121a: NO), the server control section 11 proceeds to step S133 (see FIG. 8).

On the other hand, if any user has priority inventory (step S121a: YES), then based on the usage amount data 32 of the user who has priority inventory, the server control section 11 determines whether the usage amount of the cartridge 60 that is the same type as the cartridge 60 determined to be priority inventory, that is, the number of cartridges 60 used per month, is below a predetermined threshold value TH2 (step S122a). Here, if the user holding the priority inventory requires a time period equal to the threshold value TH1 to use up the same type of cartridge 60 as the priority inventory, it is presumed that the user will not likely use up the cartridge 60 of the same type as the priority inventory already installed in the printer 50 and further use up the priority inventory cartridge 60 by its expiration date. On the other hand, if the user holding the priority inventory has a time period less than half of the threshold value TH1 to use up a cartridge 60 of the same type to the priority inventory, it is presumed that the user will be able to use up the cartridge 60 presently installed and then to use up another cartridge 60, which is the priority inventory, by its expiration date. In other words, if the usage amount of the cartridge 60 is two or more, or the number of cartridge replacement times is two times or more, in the time period corresponding to the threshold value TH1, then the cartridge in the priority inventory can be used up after the cartridge that is already installed. Thus, the threshold value TH2, which should be compared to the actual usage amount per month, can be defined, for example, as "2" divided by the threshold value TH1. Specifically, if the threshold value TH1 is one month, the threshold value TH2 is set to "2". If the threshold value TH1 is two months, the threshold value TH2 is set to "1". The threshold value TH2 corresponds to a second threshold value. When the usage amount of the user holding the priority inventory is equal to or higher than the threshold value TH2 (step S122a: NO), the server control section 11 proceeds to step S133 (see FIG. 8). Note that the above is a case where the number of cartridges 60 used in the time period corresponding to the threshold value TH1 is the same as the value of the number of replacement times, but it is not limited to this case. For example, when a calculation method is used that uses "1" as the number of cartridge replacements when two cartridges 60 are used, then the threshold value TH2 may be set to "1" if the above threshold value TH1 is one month.

On the other hand, if the usage amount of the user holding the priority inventory is less than the threshold value TH2 (step S122a: YES), then the server control section 11 sets the collection recommendation flag to the data of the corresponding cartridge 60 in the user inventory data 31 of the user that holds the corresponding cartridge 60 (step S123). Here, if the user 1 is the user who holds the cartridge 60 with the collection recommendation flag set, the user U1 corresponds to the first user. The subsequent operations are the same as in the first embodiment so the description is omitted.

As described above, the following effects can be obtained in this embodiment.

(1) According to this embodiment, the server 10 sets the collection recommendation flag on the priority inventory when the usage amount of the user holding the priority inventory with a short time period until the expiration date, is less than the threshold value TH2. Therefore, it is possible to easily specify the cartridge 60 that should be collected for utilization or the like by other users, and to reduce the number of cartridges 60 that are wastefully disposed of.

(2) According to this embodiment, the server 10 specifies the user to whom the priority inventory with the collection recommendation flag set should be provided, based on the usage amount data 32. Thus, it is possible to have the user with the high usage amount use the priority inventory, and to reduce the number of cartridges 60 that are wastefully disposed of.

The above embodiment may be modified as follows.

In the above embodiment, the usage amount data 32 representing the usage amount of liquid within a certain time period is the number of cartridges 60 replaced per month, but this certain time period may be longer or shorter than one month. In addition, the usage amount data 32 is not limited to the number of cartridges 60 replaced, but may be the weight or volume of liquid used. For example, the server 10 can obtain the usage amount of liquid that is stored in the memory 61 of cartridge 60 as usage information from printer 50 via the network NW on a regular or an irregular basis, and use this information as the usage amount data 32. Alternatively, the server 10 may obtain the usage amount from the printer 50 when the printer control section 51 updates the usage information in the memory 61 after the liquid in the cartridge 60 has been used in the printer 50. This usage amount may be calculated based on the droplet diameter and the number of times the droplets are ejected, as determined by the print data, or it may be derived based on changes in the weight of the cartridge 60. Further, the server 10 can also calculate the number of cartridges 60 replaced based on the usage amount data obtained from the printer 50, and update the user inventory data 31.

In the above embodiment, each of the cartridges 60 stored as inventory is registered in the vendor inventory data 22 and the user inventory data 31, and is identifiable by the identification information, but this is not limited to this aspect. These inventory data may be data that records the number of cartridges 60 for each expiration date.

In the above embodiment, the vendor inventory data 22 and the user inventory data 31 are stored in the server storage section 12 of the server 10, but this is not limited to this aspect. For example, the vendor inventory data 22 may be stored in the sales company terminal 20, and the user inventory data 31 may be stored in the user terminal 40. In this case, the server control section 11 of the server 10 may perform at least one of reference or update, that is, perform management, to the vendor inventory data 22 stored in the sales company terminal 20 via the network NW. That is, the server 10 may access the vendor inventory data 22 stored in the sales company terminal 20 via the network NW. Similarly, the server control section 11 of the server 10 may perform at least one of reference and update, that is, perform management, to the user inventory data 31 stored in the user terminal 40 via the network NW. That is, the server 10 may access the user inventory data 31 stored in the user terminal 40 via the network NW. Furthermore, in this case, the server control section 11 of the server 10 may obtain the initial data of the user inventory data 31 by accessing the user inventory data 31 via the network NW.

In the above embodiment, the server control section 11 determines the transportation conditions for the delivery of cartridge 60 based on the type of cartridge 60, the season when the delivery is to be made, the location of user to whom the delivery is to be made, and the time period until the expiration date of the cartridge 60 to be delivered. However, in addition to these factors, the transportation conditions may be determined based on the climate of the location of the user to whom the delivery is made, or the traffic conditions to the location of the user. In other words, it is desirable that the transportation conditions be determined based on at least one of the following: the type of cartridge 60, the delivery season, the location of user, the time period until expiration date, the climate of the location, and the traffic conditions to the location. In this case, the delivery can be made under transportation conditions suitable for various environments, and quality deterioration of the liquid due to delivery can be suppressed.

In the above embodiment, the sales person sends the delivery instruction information and the collection instruction information from the sales company terminal 20 to the delivery person terminal 30 based on the delivery decision flag and the collection recommendation flag set by the server 10, but this is not limited to this aspect. For example, the server 10 may send the delivery instruction information and the collection instruction information to the delivery person terminal 30 without the intervention of the sales person.

In the above embodiment, the cartridge 60 collected from the user U1 is returned to the sales company's warehouse and then delivered to the user U2, but the cartridge 60 may be delivered directly to the user U2 without being returned to the warehouse.

In the above embodiment, the unused inventory and the priority inventory are collected from the users for the purpose of being utilized by other users with the high usage amount, but the liquid in the collected cartridge 60 may be diverted to a different use than the original use or used as a material to produce other products. For example, in the case of a treatment liquid for printing on a woven fabric, the treatment liquid can be used as a cleaning liquid for washing parts and devices.

In the above embodiment, the server 10 specifies the user to whom the collected cartridge 60 should be provided, and then sets the flag to instruct the delivery of the cartridge 60 after sending a message to this user, but this is not limited to this aspect. For example, the user who received the message may be able to refuse the delivery of the cartridge 60 based on a future printing plan or the like. In this case, the server 10 may specify another user to whom the cartridge is provided. On the other hand, the cartridge 60 may be delivered without sending the message.

In the above embodiment, the server 10 determines whether the inventory held by the user needs to be replenished, but the user may be able to request replenishment of inventory based on the future printing plan or the like.

In the above embodiment, the information sent from the server 10 to each of the terminal devices 20, 30, and 40 may be sent in the form of an e-mail, or it may be in the form of information received or displayed by a specified application program running on the terminal devices 20, 30, and 40. If the server 10 works as a WEB server, the information may be communicated via a WEB page provided by the server 10. Similarly, the information sent from each of the terminal devices 20, 30, and 40 and the printer 50 to the server 10 may be received by the cartridge management program 21 running on the server, or the information may be obtained via a WEB page.

In the above embodiment, the delivery person who delivers or collects the cartridge 60 sends the delivery completion information or the collection completion information to the server 10, but another person of the delivery company may send the information instead of the delivery person. Alternatively, the delivery person may send the delivery completion information and the collection completion information to the sales company terminal 20, and the sales person may send this information to the server 10.

In this embodiment, the server 10 may be configured to work as the sales company terminal 20. In this case, the server operation section and the server display section are connected to the server 10. The server operation section consists of a keyboard, a pointing device, and the like, and accepts input operations made by the sales person and transmits them to the server control section 11. The server display section consists of a liquid crystal display, an organic EL display, or the like, and displays information and the like based on the control of the server control section 11.

In the above embodiment, the server 10 is not limited to being configured by a single server, but may be distributed and configured by multiple servers. For example, the server 10 may be configured with a first server and a second server that can work together via the network NW to perform various processes. In this case, one of the first server and the second server may be configured to manage the vendor inventory data 22 and the price data 23, and the other server may be configured to manage the user data 24.

In the above embodiment, two organizations, the sales company and the delivery company, are involved in the delivery of the cartridge 60, but this is not limited to this aspect. For example, the functions of two organizations may be performed by one organization. In this case, the sales company terminal 20 and the delivery person terminal 30 may be the same terminal. Further, other organizations, such as agencies, may take on some of the functions of the above two organizations.

In the above embodiment, the location data 33 indicating the location of each user may include the address of the location or, if the user is an organization such as a company or a school, the name of the organization. In addition, the location data 33 may include a distance or a path from a predetermined location, such as a warehouse where the sales company's inventory is stored, to the location of the user, or the time required for delivery, and may include information indicating the latitude and longitude of that location.

In the above embodiment, the sales company has ownership of its inventory of the cartridges 60 held by the user, but the user may have its ownership.

In the above embodiment, the printer 50 as a recording device is a device for printing images on a printing medium, such as a serial printer, a lateral printer, a line printer, a page printer, or the like. In addition, the printing method (recording method) is not limited to the inkjet method, and it may be a thermal method, a dot impact method, a laser method, or the like. The recording material is not particularly limited as long as it is suitable for each printing method. For example, if the recording method is the laser method, the recording material is liquid toner or solid toner. The printer 50 must have at least the printing function to print on a print medium, and it may be a multifunction printer that also has functions other than the printing function. Further, the printer 50 may be a printing device that prints not only on a two-dimensional medium, but also on a medium with three-dimensional curved surface.

In the above embodiment, the printer 50, which is a liquid ejection device, is described as an example of the recording device. However, the liquid ejection device can be any device that is capable of ejecting liquid, and is not limited to the printer 50. For example, the device may be a pre-treatment device or a post-treatment device that ejects a predetermined treatment liquid onto a print medium as a pre-treatment or post-treatment for printing, or may be a liquid ejection device used for applications other than printing.

The following is a description of what can be derived from the embodiments.

The provision system includes a recording device that performs recording by applying a recording material to a medium; and a management device that manages provision of the recording material to one or more users of the recording device, wherein: the management device manages vendor inventory data, which is data that associates an inventory of the recording material held by a vendor who provisions the recording material to the one or more users with an expiration date of the recording material, and location data, which indicates a location of each of the one or more users and determines, when the vendor provisions the recording material to the one or more users, which expiration date of the recording material should be provided from the inventory of the recording material held by the vendor, based on the vendor inventory data and the location data.

According to this configuration, when providing the recording material to the user, the management device determines, based on the vendor's inventory and the user's location, which expiration date of the recording material should be provided. Therefore, it is possible to suppress the delivery of recording material with a short time period until the expiration date to a user whose location is far away and whose delivery takes time, and to reduce the amount of recording material that is disposed of wastefully.

In the above provision system, it is desirable that the management device determines the transportation conditions when the deliver person delivers the recording material to the one or more users, and assigns an identifier indicating the determined transportation conditions to the data of the recording material to be delivered in the vendor inventory data.

According to this configuration, the identifier indicating the transportation conditions is assigned to the recording material to be delivered in the vendor inventory data, thus it is possible to instruct the delivery person on the appropriate transportation conditions In the above provision system, it is desirable that the management device determines the transportation conditions according to at least one of the following: the type of the recording material, the season when the recording material is to be delivered, the location of the user to whom the recording material is to be delivered among the one or more users, the time period until the expiration date of the recording material, the climate of that location, and traffic conditions to that location.

According to this configuration, the transportation conditions of the recording material is determined based on at least one of the type of recording material, the season when the recording material is delivered, the location of the user to whom the recording material is delivered, the time period until the expiration date of the recording material, the climate of that location, and the traffic conditions to that location. Thus, it is possible to deliver the recording material under transportation conditions suitable for various environments, and the quality deterioration of recording material due to delivery can be suppressed.

A provision method of providing a recording material to one or more users who use a recording device that performs recording by applying the recording material to a medium, the provision method includes managing vendor inventory data, which is data that associates an inventory of the recording material held by a vendor who provisions the recording material to the one or more users with an expiration date of the recording material, and location data, which indicates a location of each of the one or more users and when the vendor provisions the recording material to the one or more users, determining, based on the vendor inventory data and the location data, which expiration date of the recording material should be provided from the inventory of the recording material held by the vendor.

According to this method, when providing the recording material to the user, it is determined which expiration date of the recording material should be provided from the inventory held by the vendor based on the inventory held by the vendor and the location of the user. Therefore, it is possible to suppress the delivery of inventory with a short time period until the expiration date to the user whose location is far away and whose delivery takes time, and to reduce the amount of recording material that is wastefully disposed of.

A management device that manages provision of a recording material to one or more users who use a recording device that performs recording by applying the recording material to a medium, wherein: the management device manages vendor inventory data, which is data that associates an inventory of the recording material held by a vendor who provisions the recording material to the one or more users with an expiration date of the recording material, and location data, which indicates a location of each of the one or more users and determines, when the vendor provisions the recording material to the one or more users, which expiration date of the recording material should be provided from the inventory of the recording material held by the vendor, based on the vendor inventory data and the location data.

According to this configuration, when providing the recording material to the user, it is determined which expiration date of the recording material should be provided from the inventory held by the vendor based on the inventory held by the vendor and the location of the user. Therefore, it is possible to suppress the delivery of inventory with a short time period until the expiration date to the user whose location is far away and whose delivery takes time, and to reduce the amount of recording material that is wastefully disposed of.

What is claimed is:

1. A provision system comprising:
   a recording device that performs recording by applying a recording material to a medium; and
   a management device that manages provision of the recording material to one or more users of the recording device, wherein:
   the management device
      manages vendor inventory data, which is data that associates an inventory of the recording material held by a vendor who provisions the recording material to the one or more users with an expiration date of the recording material, and location data, which indicates a location of each of the one or more users and
      determines, when the vendor provisions the recording material to the one or more users, which expiration date of the recording material should be provided from the inventory of the recording material held by the vendor, based on the vendor inventory data and the location data.

2. The provision system according to claim 1, wherein:
   the management device determines transportation conditions when a delivery person delivers the recording material to the one or more users, and assigns an identifier indicating the determined transportation conditions to the vendor inventory data associated with a data indicating the recording material to be delivered.

3. The provision system according to claim 2, wherein:
   the management device determines the transportation conditions based on at least one of a type of the recording material, season when the recording material is to be delivered, a location of user to whom the recording material is to be delivered among the one or more users, time period until expiration date of the recording material, climate of the location, and traffic conditions to the location.

4. A provision method of providing a recording material to one or more users who use a recording device that performs recording by applying the recording material to a medium, the provision method comprising:
   managing vendor inventory data, which is data that associates an inventory of the recording material held by a vendor who provisions the recording material to the one or more users with an expiration date of the recording material, and location data, which indicates a location of each of the one or more users and
   when the vendor provisions the recording material to the one or more users, determining, based on the vendor inventory data and the location data, which expiration date of the recording material should be provided from the inventory of the recording material held by the vendor.

5. A management device that manages provision of a recording material to one or more users who use a recording device that performs recording by applying the recording material to a medium, wherein:

the management device manages vendor inventory data, which is data that associates an inventory of the recording material held by a vendor who provisions the recording material to the one or more users with an expiration date of the recording material, and location data, which indicates a location of each of the one or more users and determines, when the vendor provisions the recording material to the one or more users, which expiration date of the recording material should be provided from the inventory of the recording material held by the vendor, based on the vendor inventory data and the location data.

* * * * *